US011920652B2

(12) United States Patent
Okada (10) Patent No.: US 11,920,652 B2
(45) Date of Patent: Mar. 5, 2024

(54) TORSIONAL DAMPER (71) Applicant: NOK CORPORATION, Tokyo (JP)

(72) Inventor: Tomoyuki Okada, Saihaku-gun (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 17/780,328

(22) PCT Filed: Nov. 25, 2020

(86) PCT No.: PCT/JP2020/043860
§ 371 (c)(1),
(2) Date: May 26, 2022

(87) PCT Pub. No.: WO2021/124821
PCT Pub. Date: Jun. 24, 2021

(65) Prior Publication Data
US 2023/0020869 A1 Jan. 19, 2023

(30) Foreign Application Priority Data
Dec. 20, 2019 (JP) ................. 2019-230169

(51) Int. Cl.
F16F 15/126 (2006.01)
(52) U.S. Cl.
CPC .................. F16F 15/126 (2013.01)
(58) Field of Classification Search
CPC .................................... F16F 15/126
See application file for complete search history.

(56) References Cited

U.S. PATENT DOCUMENTS 8,246,872 B2 *  8/2012  Hodjat ................. B29C 44/188
                                               264/46.5
9,327,482 B2 *  5/2016  Feng .................. B32B 38/0036
(Continued)

FOREIGN PATENT DOCUMENTS

JP    2007-009073 A    1/2007
JP    2018-096455 A    6/2018
(Continued)

OTHER PUBLICATIONS

International Search Report (English and Japanese) issued in PCT/JP2020/043860, dated Jan. 12, 2021; ISA/JP (5 pages).
(Continued)

Primary Examiner — Vicky A Johnson
(74) Attorney, Agent, or Firm — Harness, Dickey & Pierce, P.L.C.

(57) ABSTRACT

A torsional damper is provided with: a hub affixed to a rotary shaft and having an outer-circumferential surface along a circle centered on the rotary shaft; an annular oscillation ring having an inner-circumferential surface the diameter of which is larger than the outer-circumferential surface of the hub on a circle centered on the rotary shaft; and a rubber ring that exists in a compressed state between the outer-circumferential surface of the hub and the inner-circumferential surface of the oscillation ring, comprises a rubber composition the main component of which is EPDM, and has a loss coefficient (tan δ) of 0.18 or higher when the surface temperature is 60±5° C. When subjected to resonance point tracking, the rubber thickness (c) and the maximum attained surface temperature (Tmax) of the rubber ring during continuous excitation at the resonance point satisfy a prescribed relational expression.

1 Claim, 6 Drawing Sheets (56) References Cited

U.S. PATENT DOCUMENTS

2012/0231909 A1* 9/2012 Shin ................. F16F 15/126
  474/94
2020/0048446 A1 2/2020 Negami

FOREIGN PATENT DOCUMENTS

JP  2019-131657 A  9/2019
WO  2018-194162 A1  10/2018

OTHER PUBLICATIONS

Extended European Search Report for corresponding Application No. 20901100.6 dated Dec. 21, 2023 (8 Pages).

* cited by examiner

TORSIONAL DAMPER

CROSS REFERENCE TO RELATED APPLICATIONS

This application is a U.S. National Phase Application under 35 U.S.C. 371 of International Application No. PCT/JP2020/043860, filed on Nov. 25, 2020, which claims priority to Japanese Patent Application No. 2019-230169, filed on Dec. 20, 2019. The entire disclosures of the above applications are expressly incorporated by reference herein.

BACKGROUND

Technical Field

The present invention relates to a torsional damper.

Related Art

A torsional damper (hereinafter referred to also as TVD) is a product which is attached to an end of a crankshaft and has the function of reducing torsional vibration of the crankshaft by the action of a rubber ring fit between a hub and a vibration ring (mass).

The TVD may also serve as a crank pulley that transmits power to auxiliary devices (an alternator, an air conditioner, and a water pump) through a belt.

When the torsional vibration of the crankshaft exceeds the resonance area or its vicinity, relative vibration in a torsional direction occurs between the hub and the vibration ring of the TVD, thus causing heat generation in the rubber ring of the TVD. As a result, the rubber ring may be broken when the temperature is equal to or higher than the heat resisting temperature of the rubber ring.

An example of a conventional method related thereto is a method described in JP 2018-96455 A.

JP 2018-96455 A describes a torsional damper including: a damper hub which is mounted on a rotating shaft and rotates integrally with the rotating shaft; and an inertial ring mounted on the damper hub via a rubber member, wherein the rubber member is made of a rubber composition primarily composed of EPDM, wherein the rubber member disposed between the damper hub and the inertial ring has a loss factor (tan $\delta$pi) of 0.27 or more at a surface temperature of 60±5° C., and wherein a maximum attained surface temperature (Tmax) of the rubber member at a resonance point of the torsional damper during continuous excitation satisfies the following formula: Tmax=$\alpha \times$ln(tan $\delta$pi)+$\beta \leq 100$ (where $\alpha$ represents a coefficient in the range of −46.9 to −60.4, and $\beta$ represents a coefficient in the range of +9.4 to +27.7). JP 2018-96455 A also describes that the torsional damper like this is capable of suppressing temperature increases of the rubber member disposed between the damper hub and the inertial ring and the torsional damper that can be provided has therefore improved durability.

However, even in the torsional damper described in JP 2018-96455 A, the temperature of the rubber ring may be increased by heat generation depending on its structure.

An object of the present invention is to solve the problem as described above. Specifically, an object of the present invention is to provide a torsional damper having a structure in which breakage of its rubber ring due to heat generation is much less likely to occur.

SUMMARY

The inventor focused attention on the structure of a torsional damper on the assumption that heat generation is inevitable as a result of thermal energy applied to the TVD. Then, the inventor has made an intensive study on the structure of a torsional damper in which the rubber ring temperature is less likely to be increased even when heat is generated.

As a result, the inventor found that the rubber ring temperature is less likely to be increased in a torsional damper having a specific structure, and completed the present invention.

The present invention provides the following (i) to (iii).
(i) A torsional damper including:
   a hub fixed to a rotating shaft and having an outer peripheral surface on a circumference around the rotating shaft;
   an annular vibration ring having, on a circumference around the rotating shaft, an inner peripheral surface which is larger in diameter than the outer peripheral surface of the hub; and
   a rubber ring which is present in a compressed state between the outer peripheral surface of the hub and the inner peripheral surface of the vibration ring, which is made of a rubber composition primarily composed of EPDM, and which has a loss factor (tan $\delta$) of 0.18 or more at a surface temperature of 60±5° C.,
   wherein, when the torsional damper is subjected to a resonance point tracking process, a maximum attained surface temperature (Tmax) of the rubber ring at a resonance point during continuous excitation and a rubber thickness (c) satisfy:

$$T\text{max} \leq -6.0c+86.7, \text{ and} \qquad \text{Formula (1):}$$

$$c \leq 5.6. \qquad \text{Formula (2):}$$

(ii) The torsional damper according to (i) above,
   wherein, when the torsional damper is subjected to the resonance point tracking process, the maximum attained surface temperature (Tmax) of the rubber ring at the resonance point during the continuous excitation and the rubber thickness (c) further satisfy:

$$T\text{max} \geq 6.0c+54.0. \qquad \text{Formula (3):}$$

(iii) The torsional damper according to (i) or (ii) above, wherein Formula (2) satisfies:

$$1.0 \leq c \leq 5.6. \qquad \text{Formula (2'):}$$

Effect of the Invention

The present invention can provide a torsional damper having a structure in which breakage of a rubber ring due to heat generation is much less likely to occur.

DETAILED DESCRIPTION

<Illustration of Torsional Damper>

The present invention is now described.

The present invention provides a torsional damper including: a hub fixed to a rotating shaft and having an outer peripheral surface on a circumference around the rotating shaft; an annular vibration ring having, on a circumference around the rotating shaft, an inner peripheral surface which is larger in diameter than the outer peripheral surface of the hub; and a rubber ring which is present in a compressed state between the outer peripheral surface of the hub and the inner peripheral surface of the vibration ring, which is made of a rubber composition primarily composed of EPDM, and which has a loss factor (tan δ) of 0.18 or more at a surface temperature of 60±5° C., wherein, when the torsional damper is subjected to a resonance point tracking process, a maximum attained surface temperature (Tmax) of the rubber ring at a resonance point during continuous excitation and a rubber thickness (c) satisfy: Formula (1): Tmax≤−6.0 c+86.7, and Formula (2): c≤5.6.

The torsional damper as described above is hereinafter referred to also as the "torsional damper of the invention."

Figure 1:
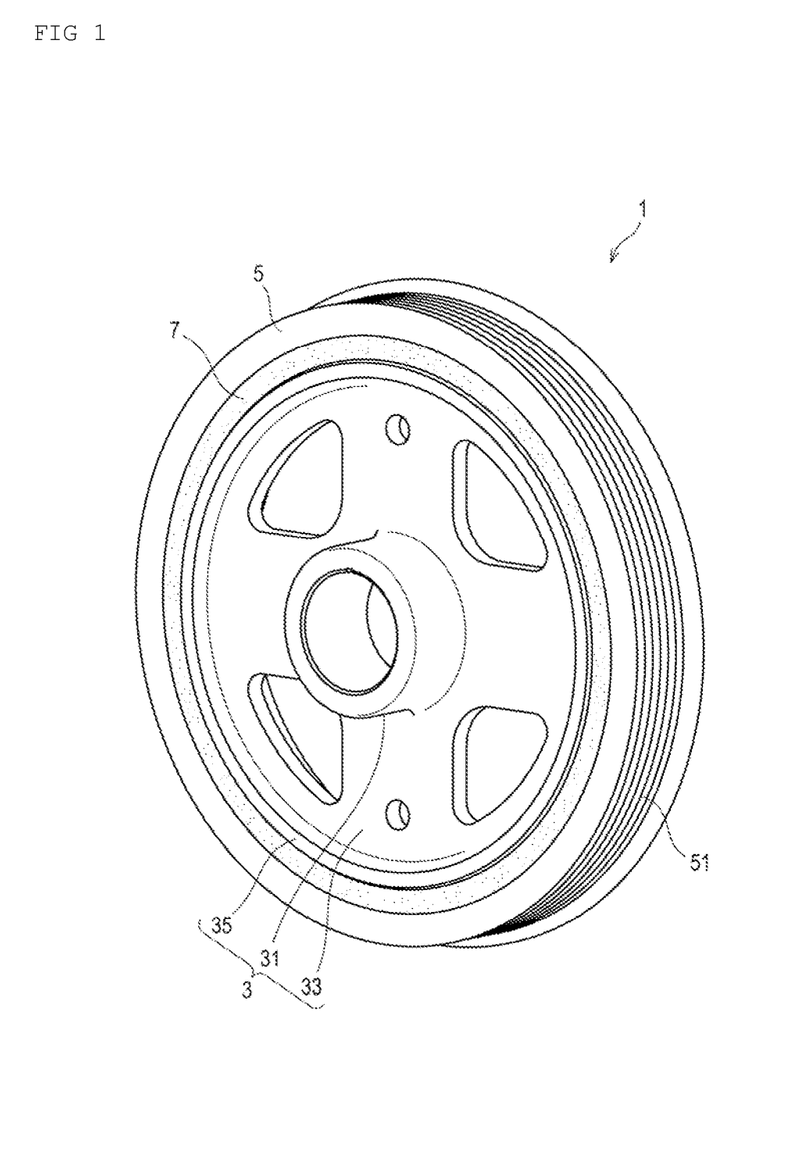
FIG. 1 is a schematic perspective view illustrating an embodiment of a torsional damper of the invention.
Figure 2:
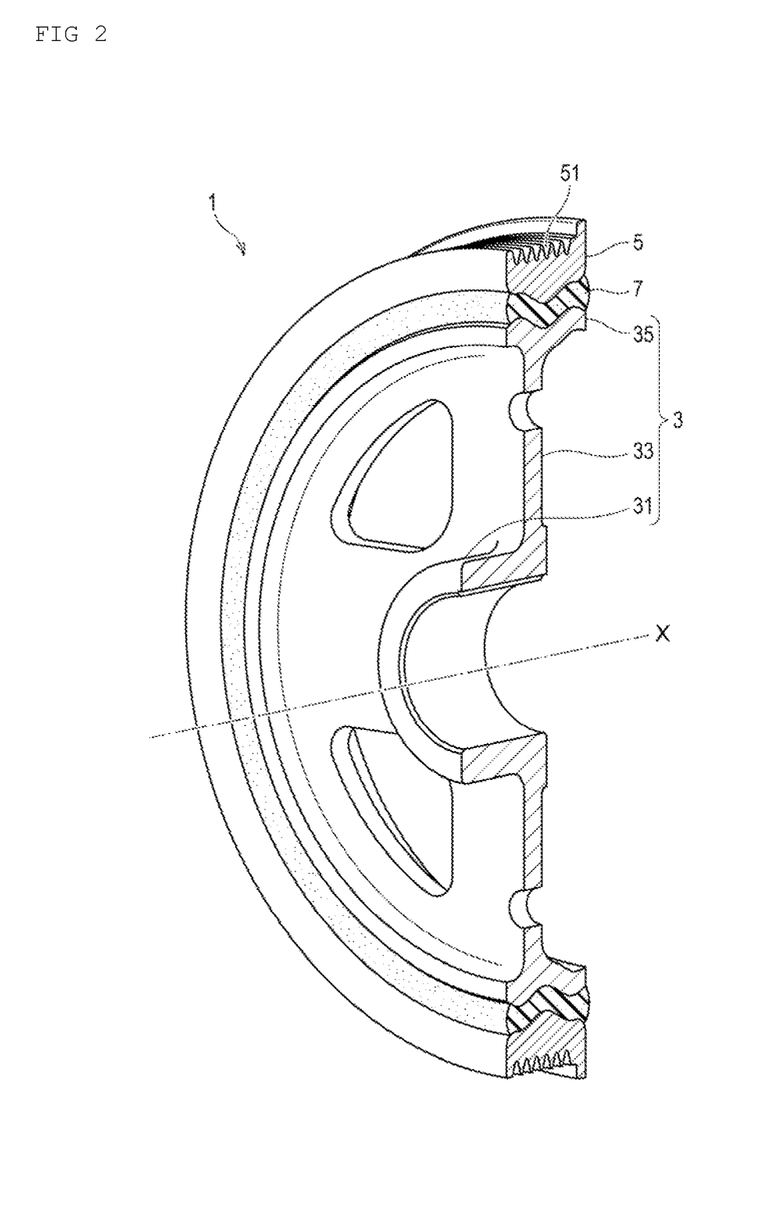
FIG. 2 is a schematic cross-sectional perspective view of the torsional damper shown in FIG. 1.

The torsional damper of the invention is first described using FIG. 1 and FIG. 2.

FIG. 1 is a schematic perspective view illustrating an embodiment of the torsional damper of the invention, and FIG. 2 is a schematic cross-sectional perspective view of the torsional damper shown in FIG. 1.

A torsional damper 1 of the embodiment illustrated in FIG. 1 and FIG. 2 can be used by being attached to an end of a crankshaft of an engine in a vehicle or the like. The torsional damper 1 has the function of absorbing torsional resonance of the crankshaft and the function of suppressing engine vibration and noise. Further, the torsional damper may also serve as a drive pulley (crank pulley) that transmits power from the rotating crankshaft to auxiliary devices through a belt.

The torsional damper 1 has a hub 3, a vibration ring 5, and a rubber ring 7.

The hub 3 includes a boss part 31, a stay part 33, and a rim part 35.

The boss part 31 is provided at a central portion of the hub 3 in its radial direction. The boss part 31 is fixed to an end of the crankshaft (rotating shaft) and the hub 3 is driven to rotate around an axis of rotation X.

The stay part 33 extends in the radial direction from the boss part 31.

The rim part 35 is provided on an outer peripheral side of the stay part 33. The rim part 35 has a cylindrical shape and the vibration ring 5 is connected to an outer peripheral side of the rim part 35 via the rubber ring 7.

An outer peripheral surface of the rim part 35 is present on a circumference around the axis of rotation X.

A metallic material such as cast iron or the like can be used as a raw material to form each of the boss part 31, the stay part 33, and the rim part 35.

Further, each of the boss part 31, the stay part 33, and the rim part 35 is preferably made of particularly flake graphite cast iron, spheroidal graphite cast iron, hot-rolled steel sheet for use in automobile structures or the like. Examples of the flake graphite cast iron that may be illustrated include FC100, FC150, FC200, FC250, FC300 and FC350.

Examples of the spheroidal graphite cast iron that may be illustrated include FCD350-22, FCD350-22L, FCD400-18, FCD400-18L, FCD400-15, FCD450-10, FCD500-7, FCD600-3, FCD700-2, FCD800-2, FCD400-18A, FCD400-18AL, FCD400-15A, FCD500-7A, and FCD600-3A. Examples of the hot-rolled steel sheet for use in automobile structures that may be illustrated include SAPH310, SAPH370, SAPH410, and SAPH440.

The vibration ring 5 is placed outside the hub 3 in its radial direction. An inner peripheral surface of the vibration ring 5 has a larger diameter than the outer peripheral surface of the hub 3. The inner peripheral surface is present on a circumference around the crankshaft (axis of rotation X).

Further, pulley grooves 51 over which the belt is stretched are formed at an outer peripheral surface of the vibration ring 5. The pulley grooves 51 serve as a pulley for power transmission.

A metallic material such as cast iron or the like can be used as a raw material to form the vibration ring 5.

The vibration ring 5 is preferably made of flake graphite cast iron. This is because the flake graphite cast iron has high vibration absorption performance and is also excellent in abrasion resistance. Examples of the flake graphite cast iron that may be illustrated include FC100, FC150, FC200, FC250, FC300 and FC350.

The rubber ring 7 is inserted into a gap portion between the outer peripheral surface of the hub 3 and the inner peripheral surface of the vibration ring 5. The rubber ring 7 serves to reduce torsional vibration of the crankshaft that occurs during driving in a vehicle or the like, thus preventing breakage, or to reduce noise and vibration due to engine vibration.

The rubber ring 7 can be obtained by forming a rubber composition primarily composed of an ethylene/propylene/diene ternary copolymer (EPDM) and additionally containing preferably carbon black and process oil into a cylindrical shape or other shapes through vulcanization using, for instance, a conventionally known method.

As for the compounding amount, the rubber composition contains EPDM in an amount of preferably 10 to 60 mass, more preferably 15 to 55 mass %, even more preferably 20 to 50 mass %, and still more preferably 30 to 50 mass %.

The carbon black content with respect to 100 parts by mass of EPDM is preferably 40 to 130 parts by mass, more preferably 50 to 100 parts by mass, and even more preferably 60 to 80 parts by mass.

The rubber composition may contain Chinese white, stearic acid, an antioxidant, a peroxide, a crosslinking agent or other components.

The loss factor (tan δ) of the rubber ring 7 at a surface temperature of 60±5° C. is 0.18 or more, preferably 0.18 to 0.40, more preferably 0.19 to 0.35, and even more preferably 0.20 to 0.28.

The loss factor (tan δ) at the surface temperature of 60±5° C. means a value obtained by measurement with a high frequency vibration tester according to the resonance point tracking process (natural frequency measurement). The measurement according to the resonance point tracking process is performed under the following conditions:

Excitation amplitude: ±0.05 deg

Phase during excitation: −90 deg

Ambient temperature: 23±3° C.

Rubber surface measurement method: Non-contact surface thermometer.

<Manufacturing Method>

There is no particular limitation on the method of manufacturing the torsional damper of the invention as described above.

The torsional damper can be manufactured for instance by a method to be described below.

Figure 3:
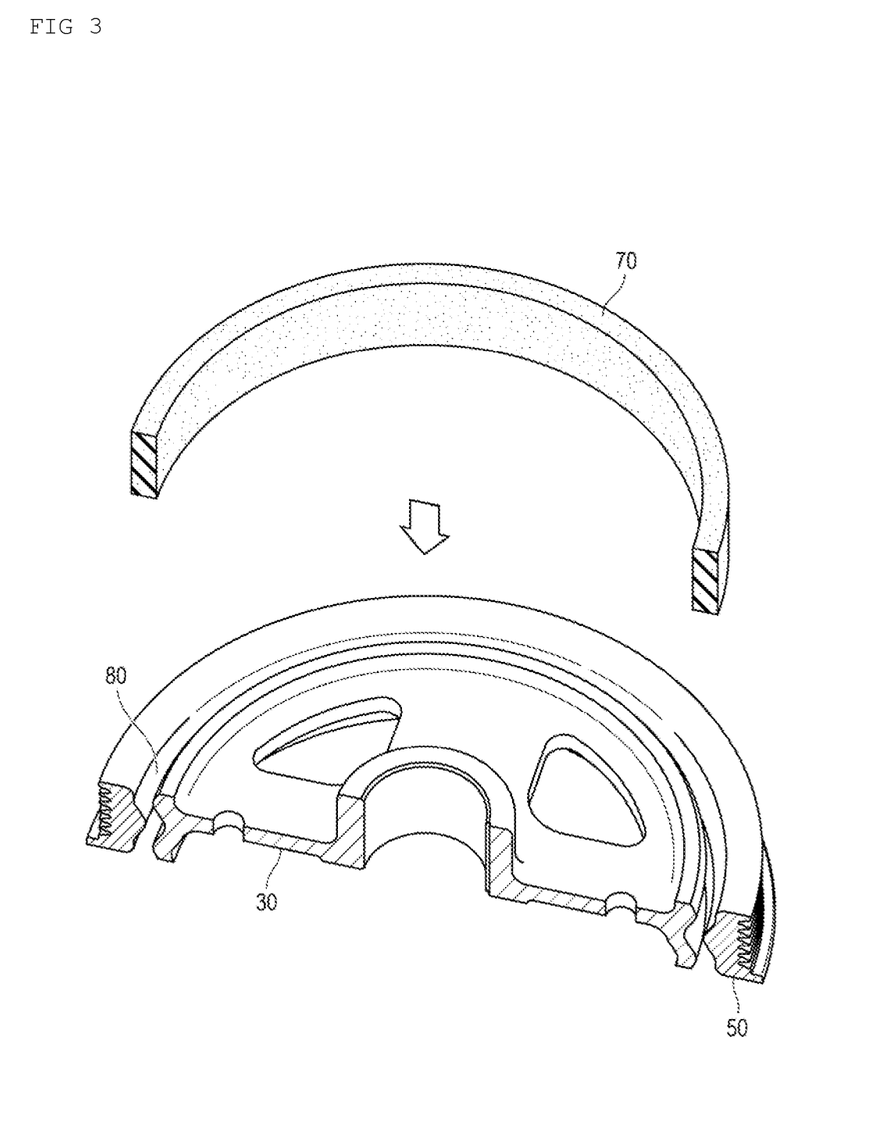
FIG. 3 is a schematic cross-sectional perspective view for illustrating a method of manufacturing the torsional damper shown in FIG. 1.

First, a hub 30 and a vibration ring 50 as shown in FIG. 3 are prepared, and a torque improving liquid is applied thereto by a means such as spraying. A solution obtained by dissolving a silane coupling agent in a hydrocarbon solution (solvent) such as toluene or xylene can be mainly used as the torque improving liquid. The torque improving liquid is preferably applied to portions of the hub 30 and the vibration ring 50 which come into contact with the rubber ring 70, specifically the inner peripheral surface of the vibration ring 50 and the outer peripheral surface of the rim part of the hub 30.

Then, as shown in FIG. 3, the rubber ring having a fitting liquid applied thereto is press fit into a space (gap portion 80) between the hub 30 and the vibration ring 50 using a press fitting tool such as a press machine. The space in the gap portion 80 preferably has a narrower width than the thickness of the rubber ring 70. Specifically, the ratio of the thickness of the rubber ring 70 to the width of the space in the gap portion 80 is preferably about 0.6 to 0.9.

In the torsion damper of the invention, the rubber ring is present in a compressed state between the outer peripheral surface of the hub and the inner peripheral surface of the vibration ring.

<Examination of Structure of Torsional Damper that May Influence Temperature of Rubber Ring>

The inventor prepared torsional dampers of various structures which were different in vibration ring thickness (a), fitting width (b), rubber thickness (c), fitting diameter (d), and hub fitting portion thickness (e), and examined influences on the rubber ring temperature.

Figure 4:
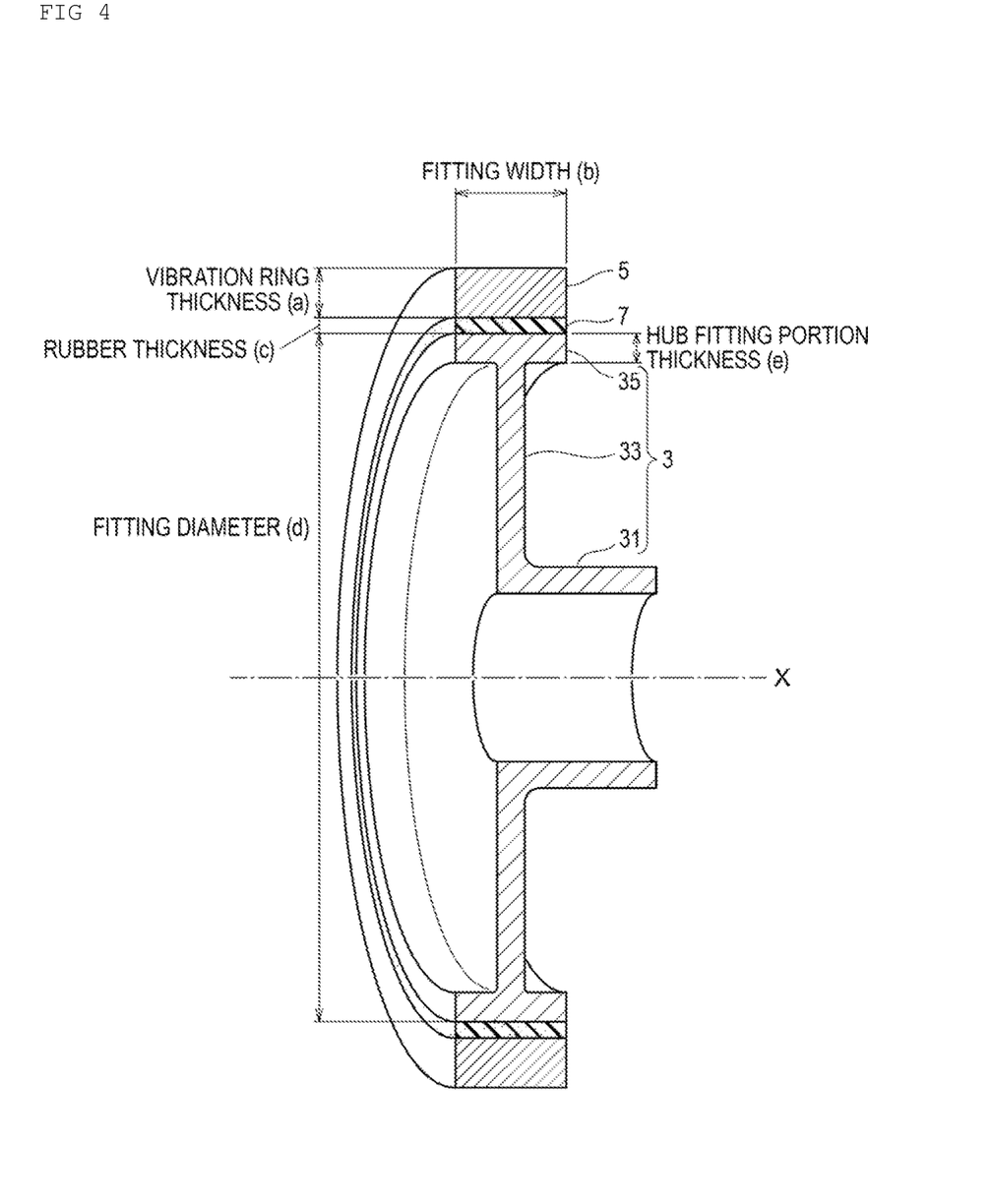
FIG. 4 is a schematic cross-sectional perspective view of the torsional damper subjected to a resonance point tracking process.

The vibration ring thickness (a) as used herein refers to, as shown in FIG. 4, a thickness of the vibration ring 5 in its radial direction (direction perpendicular to the axis of rotation X). In a case where the vibration ring thickness (a) is not fixed in the radial direction of the vibration ring 5 as in the embodiment shown in FIG. 2, the thickness of the vibration ring 5 in its radial direction is measured at randomly selected 10 points and a value obtained by averaging measured values is taken as the vibration ring thickness (a).

The fitting width (b) refers to, as shown in FIG. 4, a length of the rim part 35 of the hub 3 in the direction of the axis of rotation X. In a case where the fitting width (b) is not fixed in the direction of the axis of rotation X, the length of the longest portion of the rim part 35 of the hub 3 in the direction of the axis of rotation X is taken as the fitting width (b).

The rubber thickness (c) refers to, as shown in FIG. 4, a thickness of the rubber ring 7 in its radial direction (direction perpendicular to the axis of rotation X). In a case where the rubber thickness (c) is not fixed in the radial direction of the rubber ring 7 as in the embodiment shown in FIG. 2, the thickness of the rubber ring 7 in its radial direction is measured at randomly selected 10 points and a value obtained by averaging measured values is taken as the rubber thickness (c).

The fitting diameter (d) refers to, as shown in FIG. 4, a diameter of the hub 3 up to the outer peripheral surface of the rim part 35. Of values of the diameter (outer diameter) up to the outer peripheral surface of the rim part 35, the fitting diameter (d) refers to a diameter having the smallest value. Therefore, in a case where the rim part 35 is meandering with respect to the direction of the axis of rotation X as in the embodiment shown in FIG. 2, the fitting diameter refers to a diameter at a point on the outer peripheral surface which is closest to the axis of rotation X (center point in the direction of the axis of rotation X in the case of FIG. 2).

The hub fitting portion thickness (e) refers to, as shown in FIG. 4, a thickness of the rim part 35 of the hub 3 in its radial direction (direction perpendicular to the axis of rotation X). The hub fitting portion thickness (e) as used herein refers to a thickness of the rim part 35 except the portion where the rim part 35 is connected to the stay part 33. In a case where the hub fitting portion thickness (e) is not fixed in the direction perpendicular to the axis of rotation X as in the embodiment shown in FIG. 2, the thickness of the rim part 35 (except the portion where the rim part 35 is connected to the stay part 33) in its radial direction is measured at randomly selected 10 points in the direction perpendicular to the axis of rotation X and a value obtained by averaging measured values is taken as the hub fitting portion thickness (e).

The inventor prepared torsional dampers of various structures according to the embodiment shown in FIG. 4 which were different in vibration ring thickness (a), fitting width (b), rubber thickness (c), fitting diameter (d), and hub fitting portion thickness (e), and subjected each of the torsional dampers to the above-mentioned resonance point tracking process to measure the maximum attained surface temperature (Tmax) of the rubber ring during the process. The measurement of the maximum attained surface temperature (Tmax) of the rubber ring according to the resonance point tracking process is performed under the following conditions:

Excitation amplitude: ±0.05 deg
Phase during excitation: −90 deg
Testing time: Length of time before the surface temperature of the rubber ring is saturated.
Ambient temperature: 23±3° C.
Rubber surface measurement method: Non-contact surface thermometer.

The surface temperature of the rubber ring of the torsional damper was measured using a non-contact surface thermometer while performing the resonance point tracking process as described above.

Figure 5:
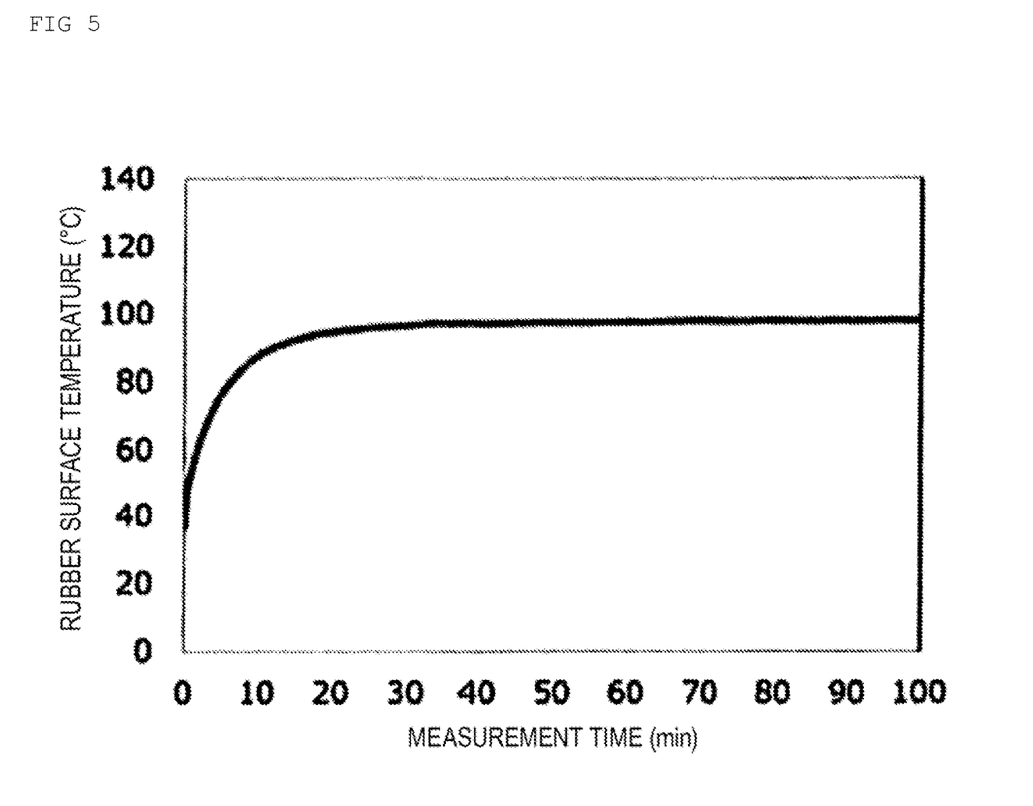
FIG. 5 is a graph showing an example of the surface temperature of a rubber ring when the resonance point tracking process was performed.

An exemplary measurement result is shown in FIG. 5.

As shown in FIG. 5, the surface temperature of the rubber ring (vertical axis in FIG. 5) is gradually increased from the start of the test and is saturated after the passage of about 30 minutes.

The surface temperature of the rubber ring at the time of saturation was taken as the maximum attained surface temperature (Tmax) of the rubber ring in the torsional damper of the relevant structure.

As described above, the inventor subjected the torsional dampers of various structures which were different in vibration ring thickness (a), fitting width (b), rubber thickness (c), fitting diameter (d), and hub fitting portion thickness (e) to the resonance point tracking process, thus measuring the maximum attained surface temperature (Tmax) of the rubber ring during the process.

Figure 6:
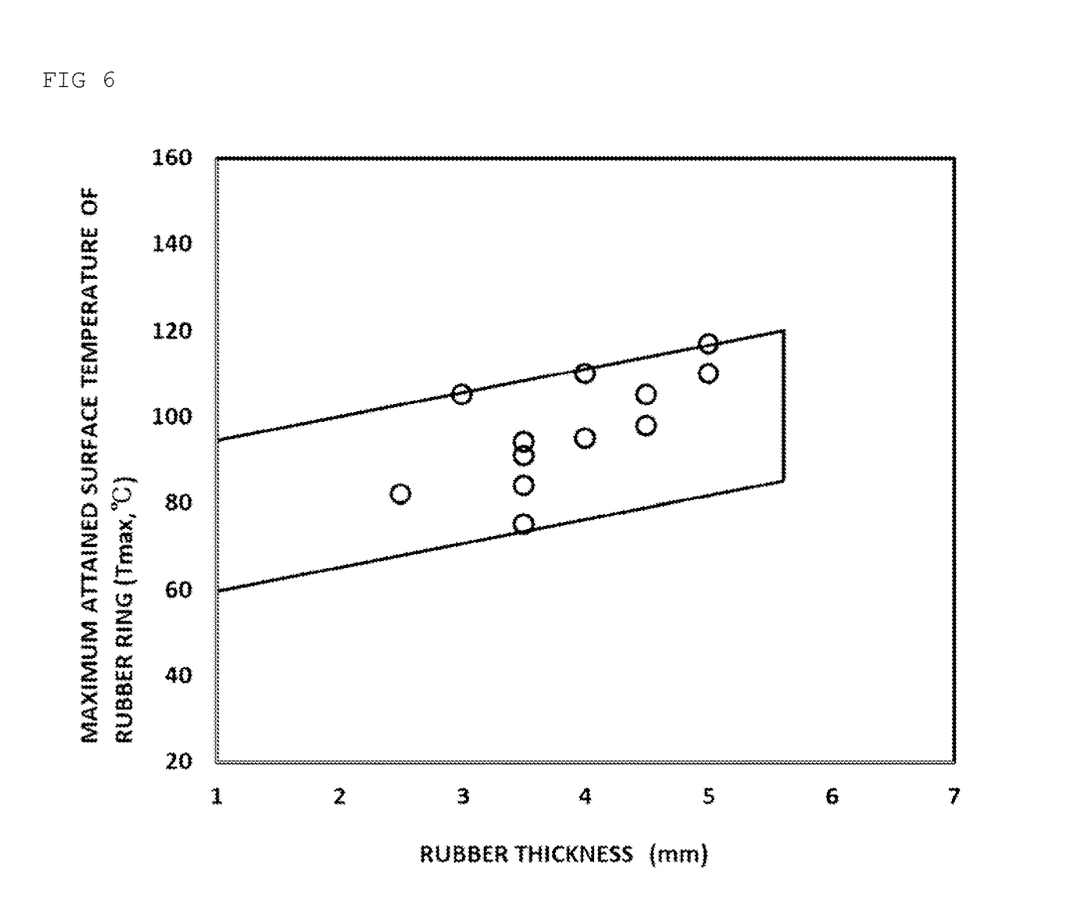
FIG. 6 is a graph showing a relationship between the rubber thickness (mm) and the maximum attained surface temperature (Tmax) of the rubber ring.

Then, it was found that the maximum attained surface temperature (Tmax) of the rubber ring depends strongly on the rubber thickness (c) and the temperature of the rubber ring is not increased in a region shown in FIG. 6.

The region is expressed by the following formulae:

$$T\max \leq 6.0c + 86.7, \text{ and} \qquad \text{Formula (1):}$$

$$c \leq 5.6. \qquad \text{Formula (2):}$$

Plotted points in FIG. 6 are data showing a relationship between the rubber thickness (c, unit: mm) measured by the above-mentioned resonance point tracking process and the maximum attained surface temperature (Tmax, unit: ° C.) of the rubber ring. The data are shown in Table 1.

TABLE 1

| Sample No. | Rubber thickness [mm] | Tmax [° C.] |
|---|---|---|
| 1 | 3.0 | 105 |
| 2 | 4.0 | 95 |
| 3 | 4.0 | 110 |
| 4 | 3.5 | 94 |
| 5 | 3.5 | 84 |
| 6 | 3.5 | 91 |
| 7 | 2.5 | 82 |
| 8 | 5.0 | 117 |
| 9 | 4.5 | 105 |
| 10 | 5.0 | 110 |
| 11 | 3.5 | 75 |
| 12 | 4.5 | 98 |

As shown in FIG. 6, in the region expressed by Formula (1) and Formula (2), the maximum attained surface temperature (Tmax) of the rubber ring is lower than 120° C. The rubber ring used in the invention is a rubber ring which is made of a rubber composition primarily composed of EPDM and has a loss factor (tan δ) of 0.18 or more at the surface temperature of 60±5° C., and the rubber ring like this is not readily broken when the maximum attained surface temperature (Tmax) is 120° C. or less.

Then, looking at the positions of the plotted points shown in FIG. 6, it is believed that the maximum attained surface temperature (Tmax) of the rubber ring is sufficiently low and breakage is not likely to occur if Formula (3): Tmax≥6.0 c+54.0 is satisfied. Therefore, the torsional damper of the invention preferably satisfies Formula (3).

The rubber thickness (c) is 5.6 mm or less according to Formula (2) but is more preferably 5.0 mm or less.

The rubber thickness (c) is preferably 1.0 mm or more, more preferably 1.5 mm or more, even more preferably 2.0 mm or more, and still more preferably 2.5 mm or more.

The torsional damper of the invention described above in detail is much less likely to cause rubber ring breakage due to heat generation.

There have heretofore existed suggestions for suppressing heat generation of a rubber ring by adjusting the material of the rubber ring (for example, the torsional damper described in JP 2018-96455 A).

However, there has not existed a technical concept that heat generation of a rubber ring is suppressed by adjusting the structure of a torsional damper, to be more specific, the thickness of a rubber ring (rubber thickness) in the direction perpendicular to the axis of rotation X as in the present invention.

A person skilled in the art could not easily achieve the present invention in that the present invention presented the technical concept and further presented with specific mathematical formulae a region where heat generation of a rubber ring can be suppressed.

The invention claimed is:

1. A torsional damper comprising:
    a hub fixed to a rotating shaft and having an outer peripheral surface on a circumference around the rotating shaft;
    an annular vibration ring having, on a circumference around the rotating shaft, an inner peripheral surface which is larger in diameter than the outer peripheral surface of the hub; and
    a rubber ring which is present in a compressed state between the outer peripheral surface of the hub and the inner peripheral surface of the vibration ring, which is made of a rubber composition primarily composed of EPDM, and which has a loss factor (tanδ) of 0.18 or more at a surface temperature of 60±5° C.,
    wherein, when the torsional damper is subjected to a resonance point tracking process, a maximum attained surface temperature (Tmax) of the rubber ring at a resonance point during continuous excitation and a rubber thickness (c) satisfy:

$Tmax \leq -6.0c+86.7,$ \hfill Formula (1)

$1.0 \leq c \leq 5.6,$ and \hfill Formula (2)

$Tmax \geq 6.0c+54.0.$ \hfill Formula (3)

* * * * *